June 22, 1948.                    C. H. WATERMAN                    2,443,647
                                  ELECTRICAL APPARATUS
                                  Filed Aug. 31, 1944

*INVENTOR.*
CHARLES H. WATERMAN
BY

Patented June 22, 1948

2,443,647

UNITED STATES PATENT OFFICE 2,443,647

ELECTRICAL APPARATUS

Charles H. Waterman, South Portland, Maine, assignor, by mesne assignments, to Submarine Signal Company, Boston, Mass., a corporation of Delaware Application August 31, 1944, Serial No. 552,078

1 Claim. (Cl. 234—1.5)

The present invention relates to a system for sound ranging or depth sounding, particularly one in which a record of the range or depth is recorded.

In systems of this nature in which the record is recorded electrically on a paper which may be conductive, semi-conductive or even highly resistant, the ordinary recording circuits usually produce a much heavier record for stronger signals than for weaker signals. At times in some recording systems this may be an advantage. However, in sound ranging systems where uniform and even records are desired, the stronger signal producing a heavy record or a burning of the recording paper at the point that the record is being made, is frequently and usually undesirable.

In work in sound ranging the signal strength level may vary over a considerable range, for instance, over a range of 40 db. while as a rule a change in the record from a very light mark to a very dark mark is brought about usually by a signal difference of no more than about 7 db., so that when the recording circuit produces amplitude changes over a range greater than 7 db., much of the record is found to be too heavy and black. In the present invention this disadvantage is overcome by compressing or suppressing the signal in such a manner that an effective signal difference level of 40 db., for instance, between the loudest and the weakest signal is converted into a signal difference sufficient so that the paper will have a substantially uniformly graded mark for the entire range of the signal received without burning the paper.

Figure 1:
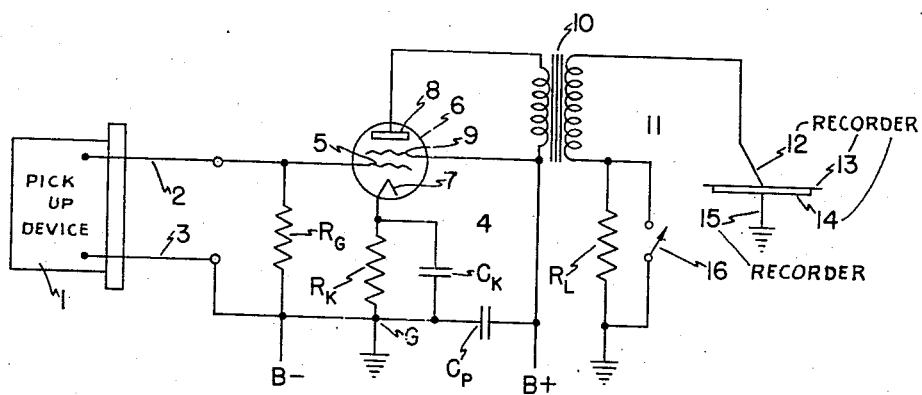
Figure 3:
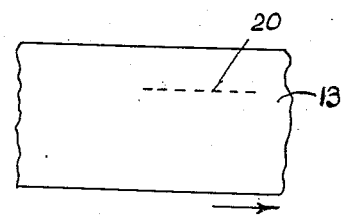
Figure 2:
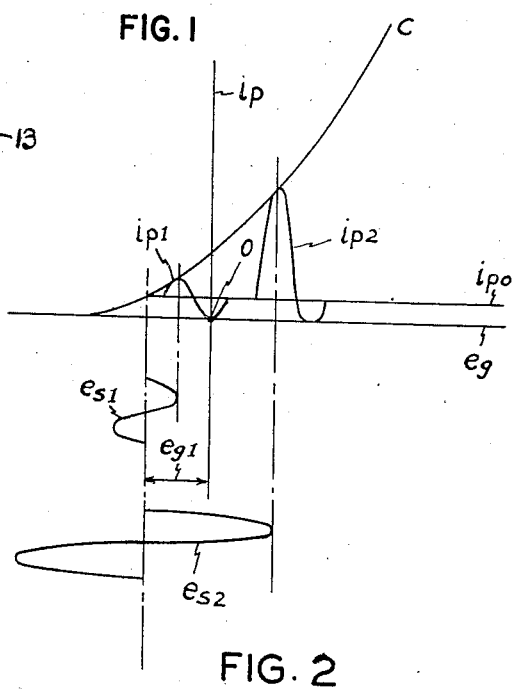

The present invention will be more fully explained and understood in connection with the embodiment of the invention set forth in the specification below and taken in connection with the drawings in which Fig. 1 shows a wiring diagram of the circuit of the present invention, Fig. 2 shows a set of curves illustrating the operation in part of the circuit of Fig. 1 and Fig. 3 shows a sample of a record made in accordance with Fig. 1.

In the circuit of Fig. 1 there is shown only the receiving system including the pickup device 1 which in submarine sound ranging may be a supersonic directional or non-directional receiver of a piezoelectric, electromagnetic, dynamic or microphonic type adapted to receive sonic or supersonic frequencies. The output of this receiver is connected by means of the lines 2 and 3 to the receiving circuit 4 which has across its input a grid resistor $R_g$ one terminal of which is connected to the control grid 5 of a vacuum tube 6 and comprises the input circuit to the vacuum tube. The tube 6 which may be of a hot cathode type has a cathode 7, an anode 8 and preferably a second grid 9. The cathode grid circuit is provided with a very high cathode bias resistor $R_k$ which is shunted by a condenser $C_k$ which will provide a time constant in the grid circuit of a magnitude such as to permit a comparatively slow charge and discharge of the circuit involving the resistor $R_k$ and the condenser $C_k$. The condenser $C_k$ will also prevent degeneration from being introduced by the resistor $R_k$. A second condenser $C_p$ is supplied in the plate cathode circuit to provide an alternating current return path from the plate to the cathode.

In addition to the above elements in the circuit the receiving circuit 4 may be coupled by a transformer 10 to the recording circuit 11 which may comprise the recording stylus 12 and the recording paper 13 which is moved at a desired speed over a conducting plate or block 14 which is grounded as shown at 15. A control resistance $R_L$ is provided to compensate, if desired, for different paper speed. This, however, may be eliminated by means of the switch 16.

The recording paper 13 may be of any of the usual types but preferably one in which a current passing through the paper will physically or chemically transform the paper in such a way as to produce a visible mark. In order to accomplish this, the transformer 10 is usually a stepup transformer to increase the alternating current plate voltage in the receiving circuit 4 to such a value that the desired chemical or physical change will occur to produce the proper mark on the paper. In Fig. 3 a recording mark may be a line 20 made on the recording paper 13.

The circuit just described in connection with Fig. 1 may be analyzed with reference to the curves of Fig. 2. In Fig. 2 the control grid voltage is plotted as a function of the plate current, the axes intersecting at the point 0. Under steady-state conditions with no signal appearing, the grid 5 is biased by a voltage designated as $e_{g1}$. Under this condition the steady-state plate current is equal to $i_{po}$ which is the point of intersection of the steady-state bias line on the curve c. With direct current only in the anode-cathode circuit, no output appears in the recording circuit. Under these conditions the bias voltage $e_{g1}$ equals $I_{po}R_k$. When an oscillating signal is impressed between the grid 5 and the ground G, the potential on the grid 5 will vary in accordance with the signal variation about the point of bias established by the voltage $e_{g1}$. An impressed signal is shown in Fig. 2 by the oscillation $e_{s1}$. Assuming for the purpose of discussion that this is a weak signal with an amplitude approximately as shown in Fig. 2, the anode-cathode current, due to this signal impressed upon the grid, will be indicated by the current curve $i_{p1}$. It will be noted that $i_{p1}$ is derived along a substantially straight portion of the characteristic curve C so that the positive and negative halves of the $i_{p1}$ are substantially similar. This signal when passed through the transformer 10 will produce an average signal which is the root mean square value of the alternating current curve $i_{p1}$. For a louder signal $e_{s2}$, shown in Fig. 2, the resultant current curve in the anode-cathode circuit is substantially as shown by the oscillating curve $i_{p2}$. This curve, it will be noted, is substantially reduced in its negative portion due to the fact that the bias of the grid established by the signal will bring about a substantial cutoff of the anode current. The normal bias on the grid 5 is so established by the grid resistor $R_k$ that the grid bias begins to effect a cutoff of anode-cathode current for all but weak signals. The difference in potential between the normal bias and cutoff bias is of the same order as the signal potential. The average value of the signal obtained from the output of the transformer 10 is accordingly not increased in the same proportions as the impressed signals, as the impressed signal causes the bias to reach the cutoff values for the anode-cathode circuits. The negative half of the current cycle is relatively reduced, thus holding down the signal magnitude in the output of the transformer 10. The average value of $i_{p2}$ will, however, increase but this will act through the resistance $R_k$ to the bias on the grid 5, thus further tending to reduce or hold down the amplification of more intense signals.

An increase in bias on the control grid tends to effect a relatively slower increase in the output signal as the input signal is increased. In order to effect a delay in the change of grid bias relative to that of increase of anode current, a substantially large condenser $C_k$ is provided which tends to retard the increase of potential across the resistance $R_k$ until the condenser $C_k$ has been charged to a value to provide a balance between the resistance and condenser. Therefore, as a signal is impressed upon the grid 5 of the tube 6, the first reaction is to increase the flow of plate current and permit the signal to operate on the recording circuit. Within a few cycles, however, as the drop across the resistance $R_k$ is built up, the negative bias is increased and the average output of the signal for strong signals is substantially decreased. This factor operates with the arrangement described in connection with Fig. 2 to hold down the strength of the signal in the recording circuit even though the received signal on the pickup unit 1 is very strong.

Having now described my invention, I claim:

In combination with a recording device for distance measurement having a recording paper adapted to be marked by the passage therethrough of electric current to indicate the distance measured, a circuit for marking the paper comprising a vacuum tube amplifying circuit having anode, cathode and a control grid, means for receiving the signal marking the end of the time interval corresponding to the distance measured and impressing the electrical translation thereof on said control grid, said anode and cathode being in a circuit having an output transformer with a secondary circuit including a stylus in series with said recording paper, a grid biasing resistor in the cathode return having a quiescent plate current flow biasing the grid to a point which will admit full amplification of both negative and positive halves of electrical translation of a weaker signal, but will cut off the negative half of a stronger signal whereby the amplification range of stronger signal will be compressed and more uniform paper markings will be obtained.

CHARLES H. WATERMAN.

REFERENCES CITED

The following references are of record in the file of this patent:

UNITED STATES PATENTS

| Number | Name | Date |
|---|---|---|
| 2,342,171 | Turner | Feb. 22, 1944 |

FOREIGN PATENTS

| Number | Country | Date |
|---|---|---|
| 432,922 | Great Britain | Aug. 6, 1935 |

OTHER REFERENCES

Reich, "Theory and Applications of Electron Tubes," McGraw-Hill Book Co., New York, N. Y. (1939).

Radiotron Designer's Handbook, 3rd edition, page 5, Figure 4.